May 9, 1939. G. W. ZINK 2,157,377
ELECTRIC CABLE
Filed Jan. 21, 1937
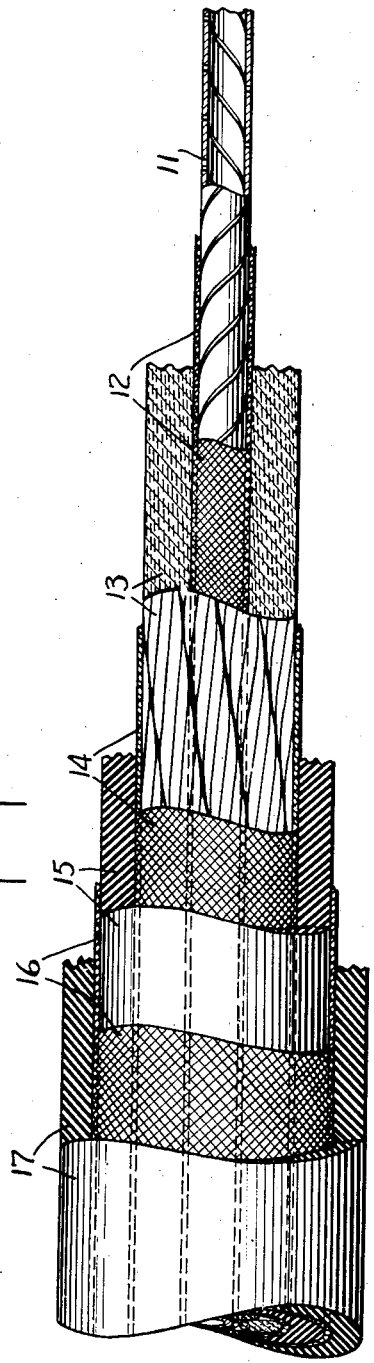
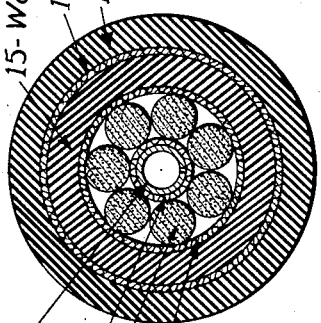
INVENTOR
George W. Zink
BY
ATTORNEY Patented May 9, 1939

2,157,377

UNITED STATES PATENT OFFICE 2,157,377

ELECTRIC CABLE

George W. Zink, Stratford, Conn., assignor to Phelps Dodge Copper Products Corporation, New York, N. Y., a corporation of Delaware Application January 21, 1937, Serial No. 121,396

6 Claims. (Cl. 174—24)

Due to the heavy current required in certain electric welding processes, large and unwieldy cables are required, in order to prevent excessive heating of the conductor. If the conductor temperature can be reduced by some cooling medium, the size and weight of the cable may be reduced and therefore more easily handled. The service life of the cable insulation would also be increased by reducing its temperature.

In order to accomplish the desired reduction of temperature, I have devised a cable having a conductor designed to carry a longitudinal current of cooling water or other suitable fluid.

The construction which I prefer and have used with success for this purpose consists of a number of fine strands of copper laid helically on a helical, spring-like strip of metal, the whole being enclosed in insulation which is impervious to the cooling fluid.

I am aware that cables have been made having longitudinal ducts but these cables have insulation pervious to the fluid in the ducts and the ducts are designed as comparatively static reservoirs of insulating fluid for the insulation. In my invention, the insulation is impervious to the fluid in the ducts and the ducts are designed, not as reservoirs, but as conduits to carry a rapidly moving stream of fluid.

I prefer to use interlocking strip such as is used in metallic hose because this prevents bits of strand clogging the water conduit. However, a gauze or similar separator between strands and spacer would serve the same purpose.

In normal practice the voltage used is low and the circuit so designed that there is no need to insulate the water supply to the cable.

The foregoing and other features of my invention will be described in connection with the accompanying drawing forming part of this specification in which I have represented my electric cable in a preferred form after which I shall point out in the claims those features which I believe to be new and of my own invention.

In the drawing:

Figure 1 represents a longitudinal section of my cable in a preferred form.

Figure 2 is a cross section thereof.

In carrying out my invention I provide a hollow spacer 11 provided for circulation of a cooling medium. This spacer may be made, either with a helically laid strip with a space between convolutions, or with a helically laid strip so formed that the edges interlock in a manner similar to that in a metallic hose.

Over this tubular structure may be placed a woven fabric cover or strainer 12. This cover is optional and its use is dependent upon the type of conductor stranding used. When using fine wire strands it has been found that after long use, particles of broken strand may enter the cooling channel and restrict the flow. The use of this covering prevents these particles from entering the channel.

The conductor 13 is stranded over the spacer tube, either with or without the strainer 12. I prefer to use a rope stranded conductor but any other non-rigid conductor may be used.

Over the conductor 13 I prefer to use a separator and binder 14 to assist in holding the shape of the conductor 13 and to prevent the insulation 15 from coming in direct contact with the conductor 13. The use of this binder is optional and with certain types of conductor may be omitted.

The insulation 15 over the conductor 13 consists of a water-resisting material, preferably rubber or a rubber-like material. Over this is applied a reinforcing layer 16 to prevent the pressure of the cooling medium from rupturing the flexible insulation 15. The outer protection 17 is a layer of material to afford mechanical protection against wear and abrasion incidental to the use of the cable in service. This mechanical protection 17 is preferably in the form of a special rubber jacket but other forms of protective covers may be used.

Various modifications of the above may be used, it being important, however, that the flexible conductor be formed over a spacer so as to allow a channel or space for the circulation of a cooling medium and that this conductor be covered with a waterproof electrical insulation which is in turn protected against mechanical injury by some means of mechanical protection.

I wish it distinctly understood that my electric cable herein described and illustrated is in the form in which I desire to construct it and that changes or variations may be made as convenient or desirable without departing from the salient features of my invention and I therefore intend the following claims to cover such modifications as naturally fall within the lines of invention.

I claim:

1. A portable welding cable comprising a water pervious internally water-cooled conductor of loosely stranded fine copper wires and water-impervious rubber insulation over the conductor.

2. A portable welding cable for use at high current density comprising a water-pervious loosely stranded fine wire conductor provided with a spacer or spacers adapted to permit the conductor to carry a stream of water sufficient in volume to effectively cool the conductor under load, and a water-impervious rubber insulation over said conductor.

3. A portable welding cable comprising a loosely stranded fine wire conductor, a water pervious spacer within the conductor adapted to permit the conductor to carry a stream of water sufficient in volume to cool the conductor under heavy loads, a strainer superimposed between the spacer and the conductor, and a water-impervious insulation over the conductor.

4. A portable welding cable, comprising a tubular core formed of a strip of material helically wound adapted to permit a stream of water sufficient in volume to cool the conductor under load to pass through it, a conductor of loosely stranded fine wires upon the core, a strainer formed around the core and under the conductor, and water-impervious insulation over the conductor.

5. The device of claim 2 with the addition of a binder over the conductor.

6. The device of claim 2 with the addition of a reinforcing layer over the insulation and a mechanical protection over all.

GEORGE W. ZINK.